| (12) United States Patent<br>Chizawa et al. | (10) Patent No.: US 7,518,757 B2<br>(45) Date of Patent: Apr. 14, 2009 |
|---|---|

(54) IMAGE READING APPARATUS AND CONTROL PROGRAM THEREFOR

(75) Inventors: Noriyoshi Chizawa, Ibaraki (JP); Katsuhiro Ishido, Ibaraki (JP)

(73) Assignee: Canon Kabushiki Kaisha (JP)

( * ) Notice: Subject to any disclaimer, the term of this patent is extended or adjusted under 35 U.S.C. 154(b) by 1117 days.

(21) Appl. No.: 10/661,824

(22) Filed: Sep. 12, 2003

(65) Prior Publication Data

US 2004/0114827 A1 Jun. 17, 2004

(30) Foreign Application Priority Data

Sep. 13, 2002 (JP) ............................. 2002-267773

(51) Int. Cl.
*G06K 9/40* (2006.01)
*H04N 1/58* (2006.01)

(52) U.S. Cl. ...................................... 358/461; 358/463

(58) Field of Classification Search ............ 250/559.45; 382/199, 274, 275; 358/463, 461, 453, 505, 358/516, 525
See application file for complete search history.

(56) References Cited

U.S. PATENT DOCUMENTS 5,982,948 A * 11/1999 Shimada et al. ............. 382/274

6,376,854 B2 * 4/2002 Shishido et al. ......... 250/559.45
2003/0016398 A1 * 1/2003 Soeda ......................... 358/461

FOREIGN PATENT DOCUMENTS

| JP | 11-289432 A | 10/1999 |
|---|---|---|
| JP | 2000-196881 A | 7/2000 |
| JP | 2002-185718 A | 6/2002 |

* cited by examiner

*Primary Examiner*—Gabriel I Garcia
(74) *Attorney, Agent, or Firm*—Rossi, Kimms & McDowell LLP

(57) ABSTRACT

There is provided an image reading apparatus that is capable increasing the detection accuracy for dust, scratches, dirt, and the like. Sixty-four lines of sampling points on a reference standard white plate are read, shading correction and averaging are carried out the read image data to suppress random noise components in the image data, the data is then stored in a sampling memory, and dust detection is carried out on the data stored in the sampling memory. Alternatively, shading correction and dust detection are carried out on image data that has been subjected to linear interpolation. It is thus possible to increase the accuracy of detection of dust, scratches, dirt, and the like while ensuring that shading correction is performed at high speed.

9 Claims, 16 Drawing Sheets

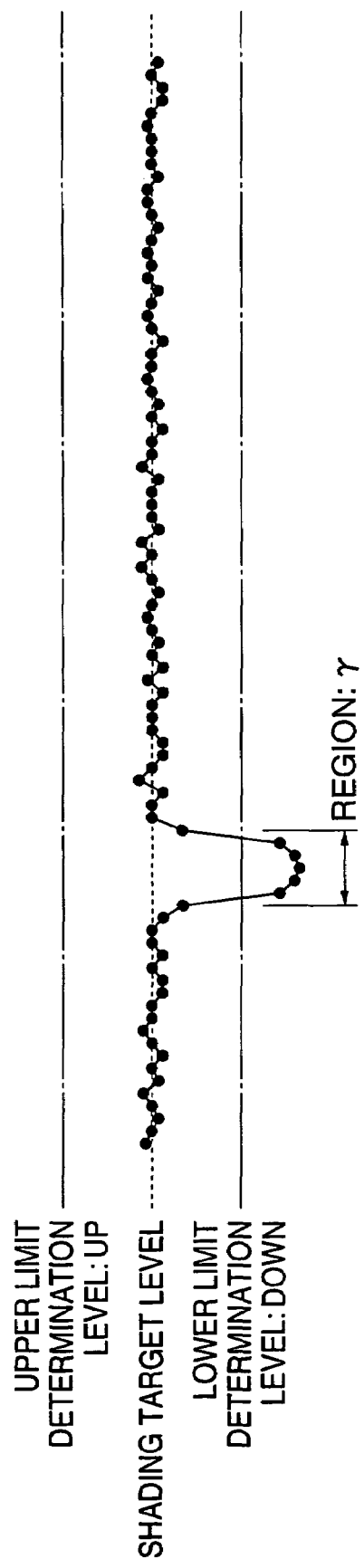

IMAGE READING APPARATUS AND CONTROL PROGRAM THEREFOR

BACKGROUND OF THE INVENTION

1. Field of the Invention

The present invention relates to an image reading apparatus that reads an original and a control program therefor, and in particular relates to an image reading apparatus that detects deterioration in image quality due to dust, scratches, dirt, etc., and a control program therefor.

2. Description of the Related Art

Conventional color image reading apparatuses will be described with reference to FIGS. 9 to 16.

FIG. 9 shows the internal construction of a color image reading apparatus that is a first conventional image reading apparatus.

In FIG. 9, reference numeral 3004 denotes an original illuminating lamp, which is implemented by a Xenon tube with external electrodes. Reference numeral 3001 denotes an original glass on which an original is placed. Reference numeral 3003 denotes an original pressing plate that presses the original placed on the original glass 3001 so as to prevent the original from lifting with respect to the original glass 3001, and also functions as a cover that protects the original glass 3001 from dirt and scratches. Reference numeral 3008 denotes a first mirror support on which the original illuminating lamp 3004 and a first mirror 3005 are mounted. Reference numeral 3009 denotes a second mirror support on which a second mirror 3006 and a third mirror 3007 are mounted. The first mirror 3005, the second mirror 3006, and the third mirror 3007 guide reflected light from the original to a three-line color CCD line sensor 3011.

Reference numeral 3010 denotes an optical lens that focuses the reflected light of the original guided by the first mirror 3005, the second mirror 3006, and the third mirror 3007 on the three-line color CCD line sensor 3011 to form an image thereon. The three-line color CCD line sensor 3011 is composed of three line sensors, separates or decompose the focused reflected light of the original into three colors RGB, and converts the color-decomposed light into electrical signals. The three line sensors are disposed so as to read at different positions in a sub-scanning direction. Reference numeral 3012 denotes an optical system driving motor that drives the first mirror support 3008 and the second mirror support 3009 in the directions shown by the arrows A and B in the drawing, and is implemented by a stepping motor, a DC motor, or the like being used.

Reference numeral 3002 denotes a standard white plate used when obtaining a reference signal for performing shading correction, and is composed of a material whose color does not change over time or according to environmental conditions such as temperature and humidity. Reference numeral 3013 denotes a first reflecting shade that is disposed so as to increase the efficiency of the original illuminating lamp 3004 and mainly directs light beams emitted on an opposite side to an original surface towards the original surface. Reference numeral 3014 denotes a second reflecting shade that increases the efficiency of the original illuminating lamp 3004 in the same way as the first reflecting shade 3013, as well as converging the light beams onto the original surface and suppressing the generation of shadows when the original is formed of image-formed sheet segments pasted on a sheet or is a three-dimensional object.

With the above construction, whenever an original is read, shading correction is performed in advance using the standard white plate 3002.

FIG. 10 is a diagram useful in explaining an operation for white shading correction. In FIG. 10, a region from P1 to P2 denotes the read area for one line of the three-line color CCD line sensor 3011. A waveform L1 shows a read waveform obtained by reading the main surface of the standard white plate 3002 before white shading correction, while a waveform L2 shows a read waveform after white shading correction. The following three causes are usually responsible for non-uniformity in the waveform L1:

(1) Variations in the sensitivity of the individual photodiodes that compose the three-line color CCD line sensor 3011;

(2) Luminous intensity distribution of the original illuminating lamp 3004; and (3) Light falloff at edges of the optical lens 3010

White shading correction is for correcting pixel by pixel the waveform L1 that is the waveform data obtained by reading the standard white plate 3002 so as for the waveform L1 to become flat like the waveform L2.

FIG. 11 is a block diagram showing the internal construction of a white shading correction circuit in the image reading apparatus appearing in FIG. 9.

In FIG. 11, reference numeral 3301 denotes a shading memory with a capacity equal to 7,500 words×16 bits. The shading memory 3301 is used in the following operations that are required for performing white shading correction:

(1) A line addition which is a process of adding read image data for a plurality of lines;

(2) An averaging process that averages pixel by pixel the data obtained by the line addition;

(3) A CD calculation process that calculates a correction coefficient; and (4) Storage of the calculated correction coefficient.

Reference numeral 3302 denotes a selector that selects data to be written in the shading memory 3301. Reference numeral 3303 denotes a shading target storage register that stores a white shading target value Kdat. Reference numeral 3304 denotes a division circuit for performing the CD calculation, and operation thereof will be described later. Reference numeral 3305 denotes an addition circuit that performs the line addition, with the addition circuit 3305 receiving an input image signal VI(n) and read data from the shading memory 3301 that has been read out in synchronization with the input image signal VI(n) and outputting an addition result thereof. Reference numeral 3306 denotes an averaging circuit, and performs an averaging process by bit shifting alone and therefore the number of lines to be averaged is limited to $2^n$. Reference numeral 3307 denotes a white shading correction circuit that performs a multiplication process pixel by-pixel on the input image signal VI(n) and a correction coefficient value CD(n) read out from the shading memory 3301, with a result thereof being outputted as white corrected data VO(n).

With this construction, white shading correction is performed as described below.

First, the original illuminating lamp 3004 is turned on and read image data for sixty-four lines on the standard white plate 3002 are added and written into the shading memory 3301. At this time, the selector 3302 is controlled so as to select an output from the addition circuit 3305.

Next, the selector 3302 is controlled so as to select an output from the averaging circuit 3306. The averaging circuit 3306 performs an averaging process for 64 lines by shifting an output from the shading memory 3301 by six bits. Next, the selector 3302 is controlled so as to select an output from the division circuit 3304. The division circuit 3304 uses the output from the shading memory 3301 and the white shading target value Kdat set in the shading target storage register 3303 to perform a calculation according to Equation 1 below and outputs the resulting value O(n):

$$O(n)=Kdat/M(n) \quad (1)$$

Here, M(n) denotes the output from the shading memory 3301, O(n) denotes the calculation result, and n denotes the pixel number. It should be noted that the above calculation process will be referred to as the "CD calculation". The above process causes the white shading correction coefficient CD(n) to be stored in the shading memory 3301.

When an original is read, the input image signal VI(n) and the white shading correction coefficient CD(n) read out from the shading memory 3301 are synchronized, inputted to the white shading correction circuit 3307, and multiplied together, which makes it possible to obtain a flat characteristic like the waveform L2 shown in FIG. 10.

As described above, white shading correction is performed for each of the RGB signals outputted from the three-line color CCD line sensor 3011.

Next, a method of detecting foreign matter such as dust that adheres to the standard white plate 3002 in the image reading apparatus of FIG. 9 will be described.

FIG. 12 shows the standard white plate 3002. In FIG. 12, the part labeled "α", denotes shading sampling points at which shading sampling is performed, reference numeral 3201 denotes adhering dust, scratches, or dirt at a part of the same points. The detection of dust, scratches, or dirt (hereinafter this will be referred to as "dust detection") on the standard white plate 3002 is performed as follows.

First, a region β on the standard white plate 3002 is read while moving the mirror support 3008. Next, a shading coefficient is calculated from the image data obtained by the reading and is stored in the shading memory 3301. By thus moving the mirror support 3008 during reading, the shading coefficient in the region β is assumed to have a value for the case where there is no dust.

Next, the shading coefficient value for the case where there is no dust that is stored in the shading memory 3301, is read by a CPU, not shown, and stored in a work memory, not shown either, for software processing. Next, shading sampling is performed on the shading sampling points α and image data obtained by the shading sampling is subjected to the addition and averaging processes and the resulting image data is stored in the shading memory 3301. Then, the CPU reads out the image data at the sampling points α stored in the shading memory 3301, multiplies the read image data by the shading coefficient read out previously, to thereby execute a white shading process, and stores the result thereof in the aforementioned work memory.

FIG. 13 shows waveforms of the shading results. In FIG. 13, a waveform L3 is the read waveform of the region β, a waveform L4 is the result of the shading correction performed by the CPU on the sampling points α, and symbol G1 denotes the part corresponding to the dust 3201. The differences between adjacent pixels in the corrected data are detected and parts where the difference value is equal to or greater than a predetermined value are determined to be dust. In FIG. 13, the part G1 is determined to be dust.

FIG. 14 is a block diagram showing the internal construction of a white shading correction circuit in a second conventional image reading apparatus. This second conventional image reading apparatus includes the white shading correction circuit shown in FIG. 14 in place of the white shading correction circuit (see FIG. 11) of the first conventional image reading apparatus. It should be noted that in FIG. 14, component elements that are the same as in the white shading correction circuit appearing in FIG. 11 have been given the same reference numerals corresponding to those in FIG. 11 are designated by identical reference numerals, and description thereof is omitted.

In FIG. 14, reference numeral 3701 denotes a selector that selects an input for the shading memory 3301. Reference numeral 3702 denotes a replace circuit that replaces data in the shading memory 3301 with image data on which shading correction has been performed. Reference numeral 3703 denotes a dust determining circuit that compares an output from the replace circuit 3702 with an upper limit determination level UP stored in an upper limit determination level storage register 3704 or a lower limit determination level DOWN stored in a lower limit determination level storage register 3705. When the output from the replace circuit 3702 is either higher than the upper limit determination level UP or lower than the lower limit determination level DOWN, the dust determining circuit 3703 sets a dust determination flag stored in a predetermined register, not shown, to "1". The dust determining circuit 3703 operates in conjunction with the operation of the replace circuit 3702.

FIG. 15 shows a waveforms indicative of the result of the dust detecting operation that uses the white shading correction circuit in the image reading apparatus appearing in FIG. 14. Waveforms L5 and L6 respectively correspond to the waveforms L3 and L4 shown in FIG. 13, and G2 corresponds to G1. At the part G2 corresponding to the dust 3201, the waveform L6 is lower than the lower limit determination level DOWN, so that the dust determination flag is "1", and it is determined that dust is present.

However, there are the following problems with the dust detection methods employed by the first and second conventional image reading apparatuses described above.

First, (1) according to the white shading correction circuit of the first conventional image reading apparatus, a long time period is required for soft shading to be performed, and if a dust detecting operation is performed when the apparatus is activated, the startup time becomes long. Also, (2) in the case where a long time period is required for soft shading to be performed and the dust detection operation is performed page by page, there is a marked degradation in reading efficiency and hence in productivity.

Furthermore, (3) according to the white shading correction circuit of the second conventional image reading apparatus, the accuracy of dust detection deteriorates due to random noise components in the image data for each single line.

FIG. 16 shows part of the image data that has been subjected to shading correction and with which data in the shading memory 3301 has been replaced by the replace circuit 3702 in the image reading apparatus of FIG. 14. In FIG. 16, the phenomenon (3) above is illustrated. In the figure, the upper limit determination level UP and the lower limit determination level DOWN are shown above and below a shading target level. A region γ shows a part where dust is present, and since an output from the replace circuit 3702 corresponding to the region γ is below the lower limit determination level DOWN, it is determined that dust is present. An image data part G3 falls below the lower limit determination level DOWN due to random noise components, so that this part is also determined to be dust by the dust determining circuit.

On the other hand, although it would be conceivable to set the determination levels higher to avoid the influence of random noise components such setting would make it impossible to detect all but large pieces of dust, resulting in a fall in the determination accuracy.

SUMMARY OF THE INVENTION

It is an object of the present invention to provide an image reading apparatus and a control program therefor, that are capable of increasing the accuracy of detection of dust, scratches, dirt, and the like.

To attain the above object, in a first aspect of the present invention, there is provided an image reading apparatus comprising an image reading device capable of reading image data of a reference member, a random noise suppressing device that suppresses random noise components in the image data of the reference member read by the image reading device, and a detecting device that detects abnormality on the reference member based on the image data having random noise components suppressed by the random noise suppressing device.

Preferably, the random noise suppressing device suppresses random noise components by averaging the read image data of the reference member.

Preferably, the random noise suppressing device suppresses random noise components by carrying out an interpolation process on the read image data of the reference member.

More preferably, the random noise suppressing device comprises a delay device that delays the read image data of the reference member, and an interpolation device that carries out the interpolation process on the read image data of the reference member and the image data delayed by the delay device.

Preferably, the image reading apparatus further comprises a shading correction device that carries out a shading correction based on the read image data of the reference member, and the random noise suppressing device suppresses random noise components in the image data on which the shading correction has been carried out by the shading correction device.

Preferably, the image reading apparatus further comprises a shading correction device that carries out a shading correction based on the image data having random noise components suppressed by the random noise suppressing device, and the detection device detects abnormality on the reference member based on the image data on which the shading correction has been carried out by the shading correction device.

Preferably, the random noise suppressing device operates only when abnormality is to be detected on the reference member by the detection device.

To attain the above object, in a second aspect of the present invention, there is provided a control program that controls an image reading apparatus and can be executed by a computer comprising an image reading module capable of reading image data of a reference member, a random noise suppressing module for suppressing random noise components in the image data of the reference member read by the image reading module, and a detecting module for detects abnormality on the reference member based on the image data having random noise components suppressed by the random noise suppressing module.

Preferably, the random noise suppressing module suppresses random noise components by averaging the read image data of the reference member.

Preferably, the random noise suppressing module suppresses random noise components by carrying out an interpolation process on the read image data of the reference member.

More preferably, the random noise suppressing module comprises a delay module for delaying the read image data on the reference member, and an interpolation module for carrying out the interpolation process on the read image data on the reference member and the image data delayed by the delay module.

Preferably, a control program further comprises a shading correction module for carrying out a shading correction based on the read image data of the reference member, and the random noise suppressing module suppresses random noise components in the image data on which the shading correction has been carried out by the shading correction module.

Preferably, a control program further comprises a shading correction module for carrying out a shading correction based on the image data having random noise components suppressed by the random noise suppressing module, and the detection module detects abnormality on the reference member based on the image data on which the shading correction has been carried out by the shading correction module.

Preferably, the random noise suppressing module is executed only when abnormality is to be detected on the reference member by the detection module.

With the above construction, it is possible to increase the accuracy of detection of dust, scratches, dirt, and the like.

Other objects and features of the present invention will be apparent from the following descriptions and the accompanying drawings, in which like reference characters designated the same or similar parts throughout the figures thereof.

BRIEF DESCRIPTION OF THE DRAWINGS

FIG. 7 is a diagram showing the relationship between image data stored in a shading memory after a replace operation performed by a shading section and dust determination levels;

DETAILED DESCRIPTION OF THE PREFERRED EMBODIMENTS

The present invention will now be described in detail with reference to the accompanying drawings showing preferred embodiments thereof.

Figure 9:
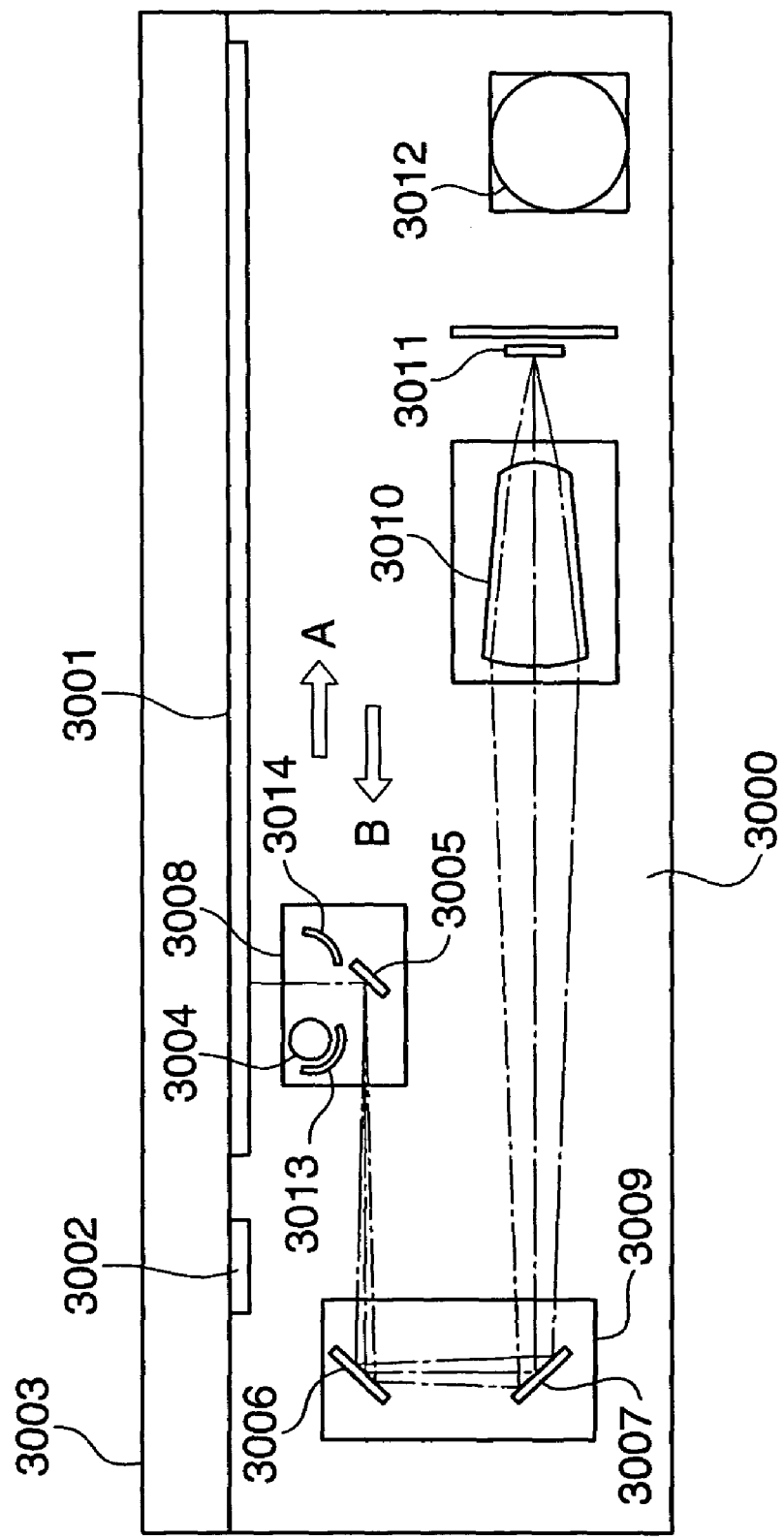
FIG. 9 is a view showing the internal construction of a color image reading apparatus as a first conventional image reading apparatus.
Figure 10:
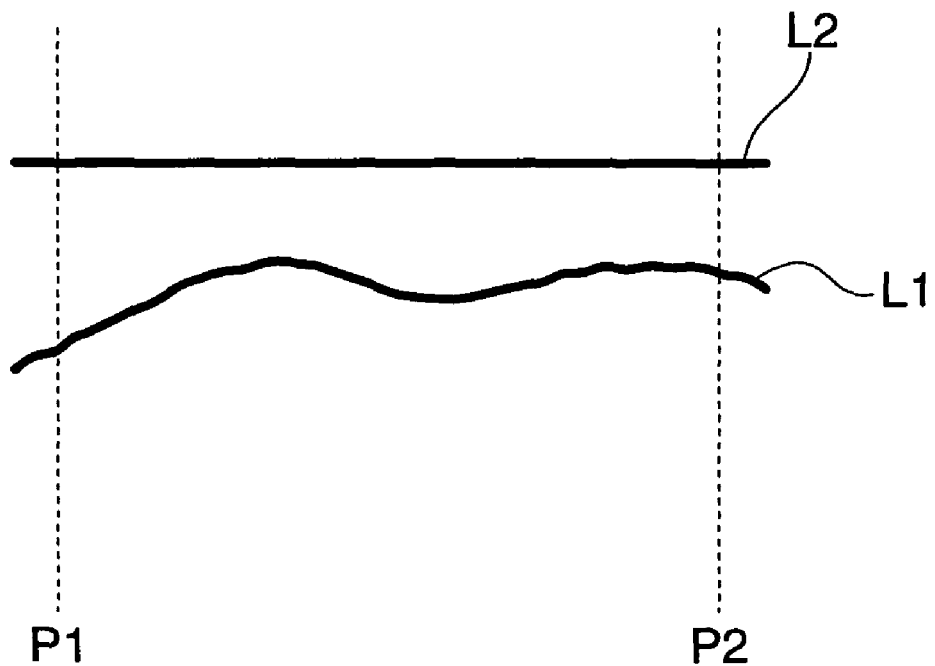
FIG. 10 is a diagram useful in explaining an operation for white shading correction.
Figure 11:
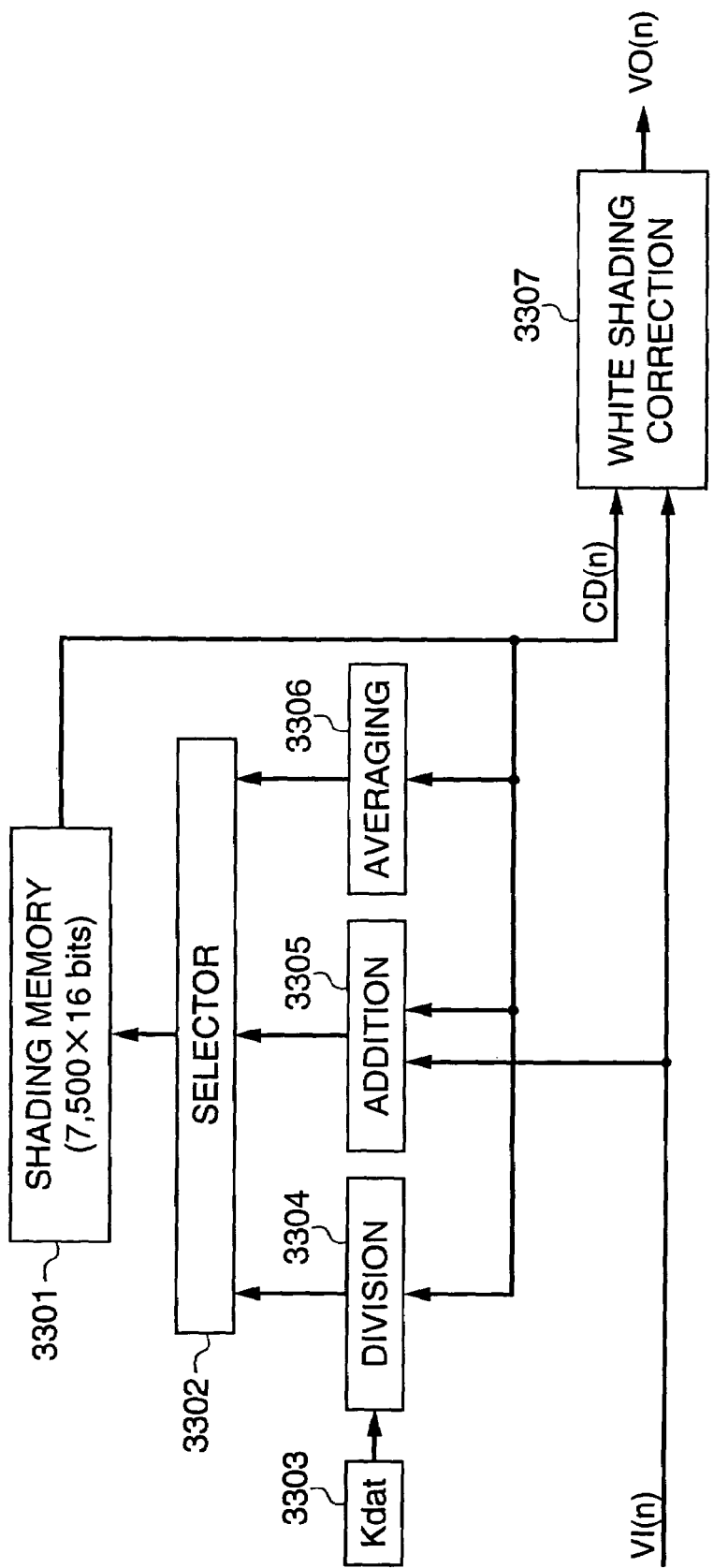
FIG. 11 is a block diagram showing the internal construction of a white shading correction circuit of the color image reading apparatus appearing in FIG. 9.
Figure 12:
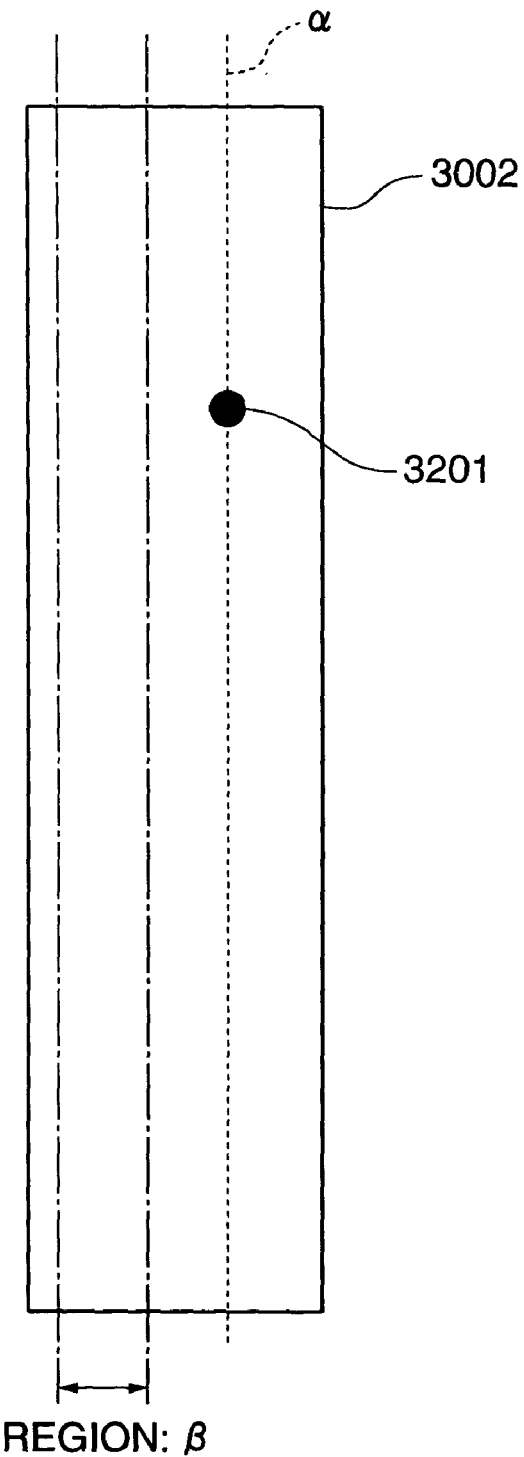
FIG. 12 is a view showing a reference standard white plate.
Figure 13:
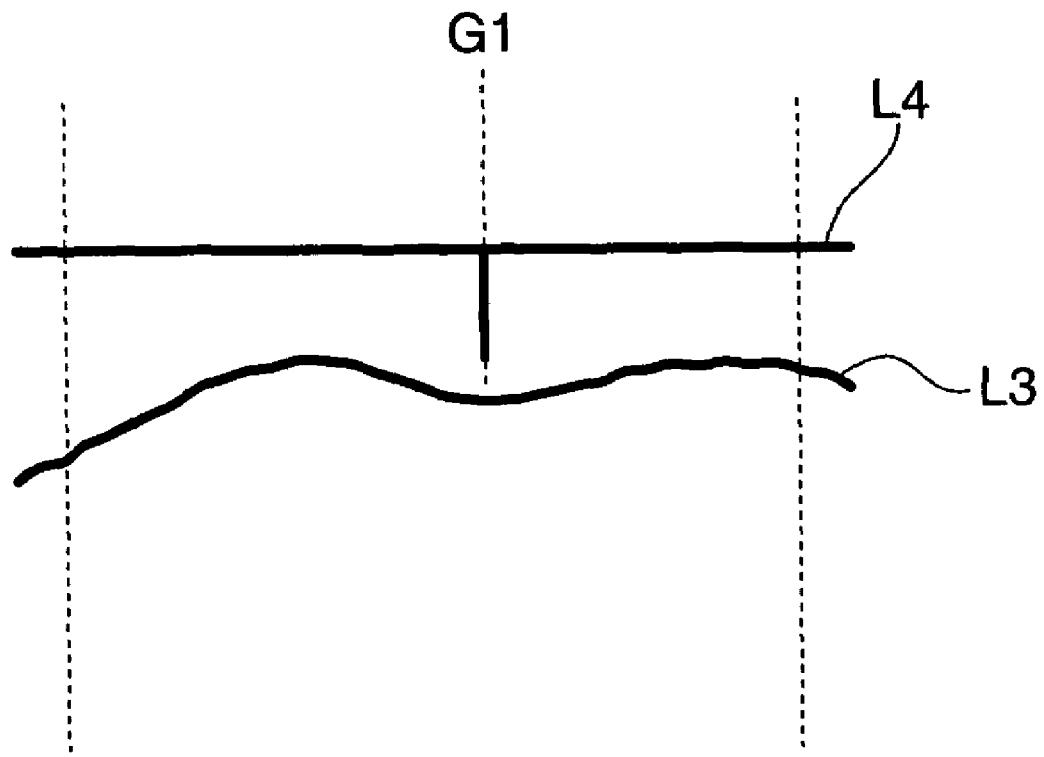
FIG. 13 is a diagram showing waveforms of a shading result.

The basic construction of an image reading apparatus according to a first embodiment of the present invention is the same as that of the conventional image reading apparatuses, which is shown in FIG. 9. It should be noted that component elements corresponding to those in the conventional image reading apparatuses are designated by identical reference numerals in the following description, and description thereof is omitted.

Figure 1:
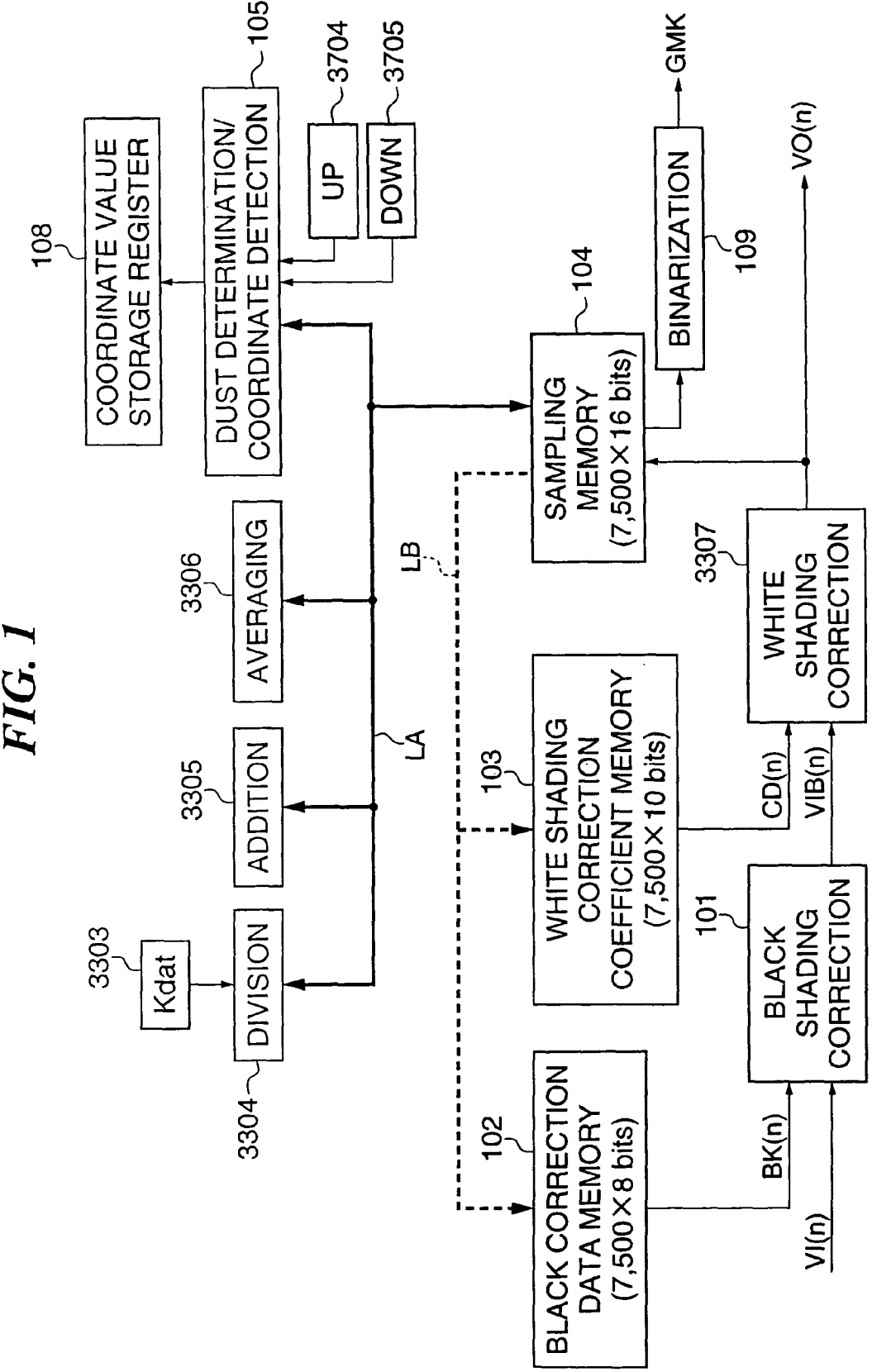
FIG. 1 is a block diagram showing the internal construction of a shading correction circuit of the image reading apparatus according to a first embodiment of the present invention.

FIG. 1 is a block diagram showing the internal construction of a shading correction circuit in the image reading apparatus according to the first embodiment of the present invention.

In FIG. 1, reference numeral 101 denotes a black shading correction circuit that performs a subtraction process pixel by pixel. The black shading correction circuit 101 subtracts black correction data BK(n), which will be described later, pixel by pixel from input image data VI(n) by performing a calculation according to Equation 2 given below, to thereby obtain black corrected data VIB(n):

$$VIB(n)=VI(n)-BK(n) \quad (2)$$

Reference numeral 102 denotes a black correction data memory that has a capacity of 7,500×8 bits and outputs black correction data BK(n) synchronized with the input image data VI(n) to the black shading correction circuit 101. In the present embodiment, the input image data VI(n) is 10-bit data, and the black level is ¼ or below of the whole image data, so that the lower 8-bit data is stored in the black correction data memory 102.

The white shading correction circuit 3307 is basically constructed in the same way as in the conventional image reading apparatuses, but in the present embodiment the white shading correction circuit 3307 performs a multiplication process pixel by pixel on the black corrected data VIB(n) from the black shading correction circuit 101 and the white shading correction coefficient CD(n), which will be described later, and outputs the result thereof as white corrected data VO(n).

Reference numeral 103 denotes a white shading correction coefficient memory that has a capacity of 7,500×10 bits and outputs the white shading correction coefficient CD(n) in synchronization with each pixel to the white shading correction circuit 3307. The white shading correction calculation is performed with an accuracy of 10 bits, so that the white shading correction coefficient memory 103 has a 10-bit construction.

Reference numeral 104 denotes a sampling memory that has a capacity of 7,500×16 bits, is connected to an output of the white shading correction circuit 3307, and is used when performing various calculations. Since the sampling memory 104 has a 16-bit construction, it is possible to perform an addition process for 64 lines if the image data is 10-bit data. For a low level like the black level, that is, if the level can be expressed by 8-bit data, it is possible to perform an addition process for 256 lines.

Symbol LB represents a data transfer line extending from the sampling memory 104 to the black correction data memory 102 and the white shading correction coefficient memory 103. Data transferred via this line LB includes an address for synchronizing and controlling the respective memories, data to be read out from the sampling memory 104 and written into the black correction data memory 102 or the white shading correction coefficient memory 103, and read and write control signals.

Symbol LA represents a data line connecting between calculation blocks (3303 to 3306, described later) that perform calculations using the sampling memory 104, and data transferred via this data line LA includes read and write data for the sampling memory 104 and write and read control signals for memory addresses.

The calculation blocks 3303 to 3306 are the same as those in the conventional image reading apparatuses. That is, the shading target storage register 3303 stores the white shading target value Kdat, the division circuit 3304 performs the CD calculation, the addition circuit 3305 performs the line addition, and the averaging circuit 3306 performs the averaging process by bit-shifting.

Reference numeral 105 denotes a dust determination/coordinate detection circuit that detects dust in the data stored in the sampling memory 104 and detects coordinates of dust, etc. In the same way as in the conventional image reading apparatuses, the upper limit determination level "UP" is stored in the upper limit determination level storage register 3704 and the lower limit determination level "DOWN" is stored in the lower limit determination level storage register 3705. Reference numeral 108 denotes a coordinate storage register that stores coordinates of dust detected by the dust determination/coordinate detection circuit 105. Reference numeral 109 denotes a binarization circuit that binarizes data read out from the sampling memory 104. When the image data is larger than the upper limit determination level "UP" or smaller than the lower limit determination level "DOWN", the binarization circuit 109 outputs "1", or otherwise outputs "0".

Figure 2:
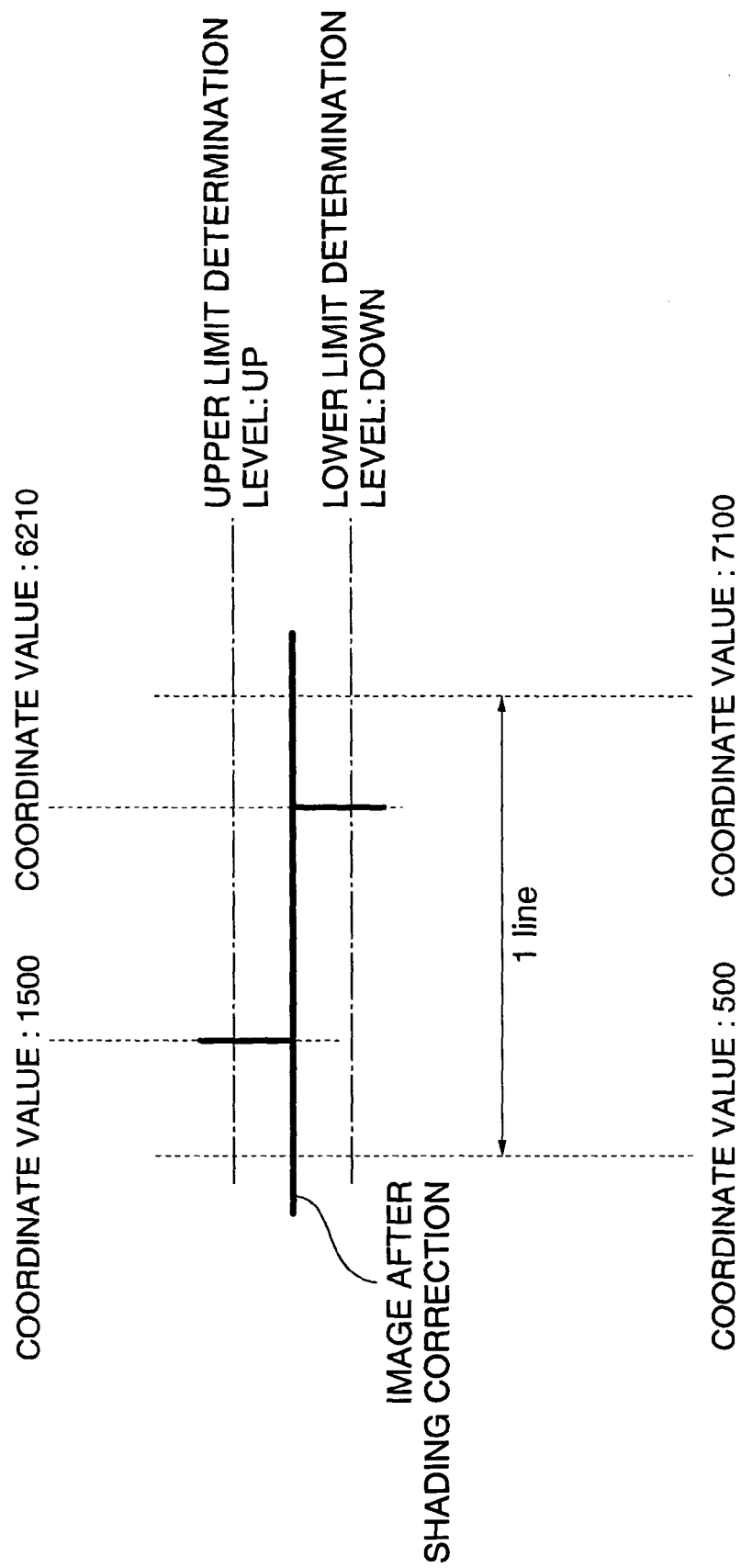
FIG. 2 shows a waveform produced by plotting image data that has been stored in the sampling memory 104 after being subjected to white shading correction.

Next, the operation for dust determination will be described with reference to FIG. 2. FIG. 2 shows a waveform produced by plotting the image data that has been stored in the sampling memory 104 after being subjected to white shading correction. In FIG. 2, a region between coordinate values (memory addresses) 500 and 7100 is set as a region in which dust detection and coordination detection are to be performed. Also in FIG. 2, the upper limit determination level "UP" set in the upper limit determination level storage register 3704 and the lower limit determination level "DOWN" set in the lower limit determination level storage register 3705 are shown above and below the image data.

In the image data illustrated in FIG. 2, it is assumed that there are three pixels at coordinate values 1500 to 1502 where the pixel data exceeds the upper limit determination level "UP" and eight pixels at coordinate values 6210 to 6217 where the pixel data falls below the lower limit determination level "DOWN". Accordingly, the dust determination/coordinate detection circuit 105 stores coordinate data for the three pixels at the coordinate values 1500 to 1502 and eight pixels at the coordinate values 6210 to 6217, that is, a total of eleven pixels in the coordinate storage register 108. It should be noted that a case where dust affects a B signal of R, G, B signals, described later, is shown as an example in the present embodiment, and that it is assumed that the phenomenon described above using FIG. 2 only occurs for the B signal.

A dust region signal GMK is outputted from the binarization circuit 109, and in the example in FIG. 2, this signal assumes a value of "1" indicative of the three pixels at the coordinate values 1500 to 1502 and the eight pixels at the coordinate values 6210 to 6217.

In the present embodiment, the operation for detecting dust using the standard white plate 3002 is identical with that of the conventional image reading apparatuses, but in particular the dust detecting operation according to the present embodiment different from that of the conventional image reading apparatuses in that dust detection is performed after random noise components have been suppressed in the image data subjected to shading correction.

Figure 3:
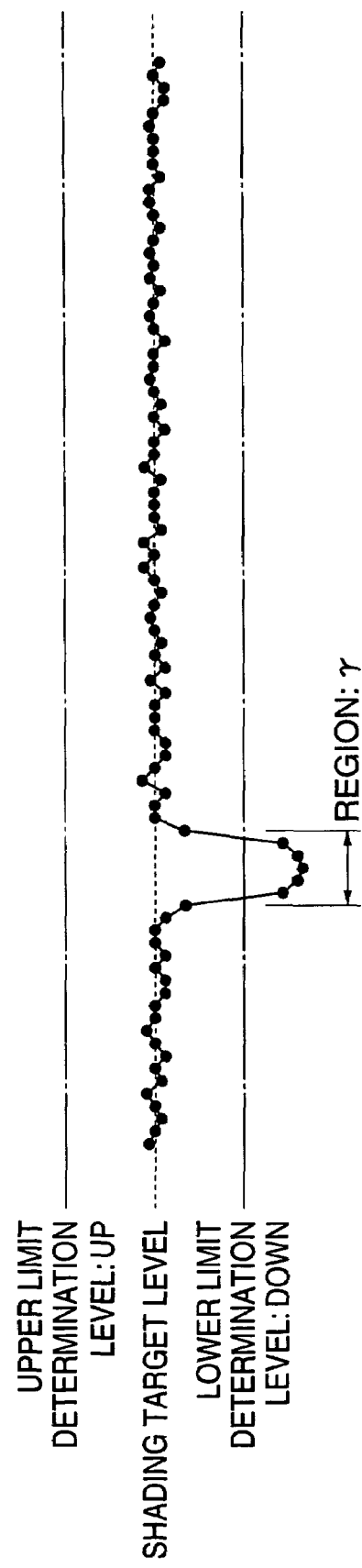
FIG. 3 shows data stored in the sampling memory, that has been obtained by reading image data at 64 lines of sampling points α of a reference standard white plate and subjecting the read image data to an averaging process.
Figure 16:
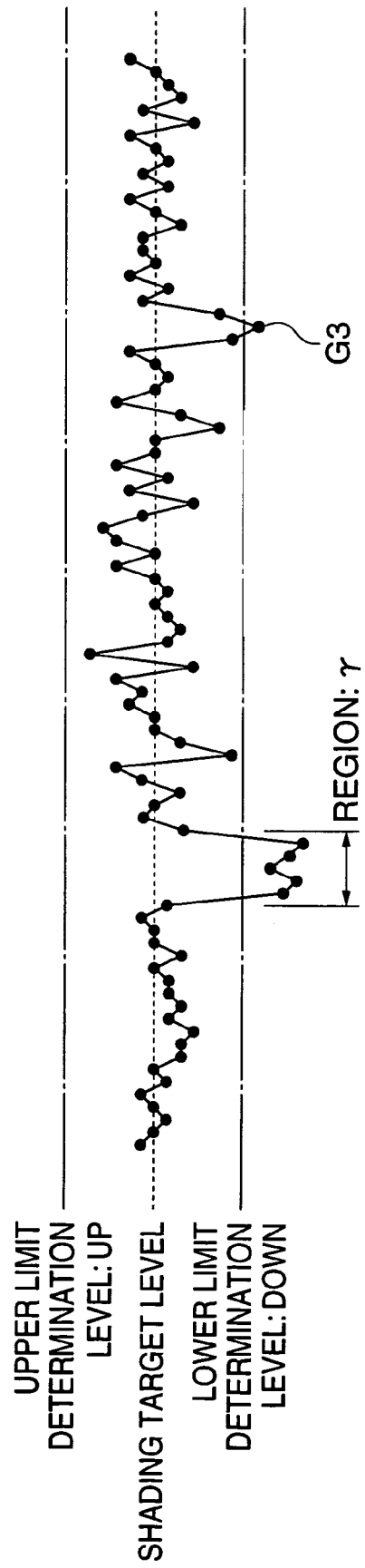
FIG. 16 is a diagram showing part of image data that has been subjected to shading correction and with which data in a shading memory has been replaced by a replace circuit in the image reading apparatus appearing in FIG. 14.

FIG. 3 shows data stored in the sampling memory 104 that has been obtained by reading image data at 64 lines of sampling points α of the standard white plate 3002 and subjecting the read image data to the averaging process. By performing the averaging process, compared with the case of the second conventional image reading apparatus shown in FIG. 16, random noise components can be sufficiently suppressed with respect to the upper limit determination level "UP" and the lower limit determination level "DOWN" disposed above and below the shading target level. Accordingly, after random noise components have been suppressed by the averaging process, anomalies, that is, dust, are detected from the image data with random noise components having been suppressed by the averaging process, so that a dust part shown by the region γ can be reliably determined as including dust without the part G3 shown in FIG. 16 being erroneously determined as including dust.

It should be noted that the period of time required for the dust determination is a very short, i.e. 19.8 ms because an addition sampling time period for 64 lines, an averaging process time period for 1 line, and a dust determination and coordinate detection time period for 1 line are required, that is, a period of time for a total of 66 lines is required, if the time period for one line is assumed to be 300 μsec. Accordingly, it is possible to perform the dust detection page by page, so that it becomes possible to prevent dust that occurs on each page from affecting read images.

As described above, according to the present embodiment, random noise components in image data after shading correction is suppressed by an averaging process, and then an anomaly detection is performed to detect dust, scratches, or dirt on the standard white plate 3002 from the image data in which random noise components has been suppressed, whereby erroneous detection due to random noise components can be prevented and the detection accuracy for anomalies can be improved. In addition, shading correction does not take an excessive period of time. Therefore, it is possible to improve the detection accuracy of dust, scratches, and dirt while ensuring that shading correction can be performed at high speed.

Further, means for suppressing random noise components is constructed of the sampling memory 104 that has a greater bit width than that of the read image data, the addition circuit 3305, and the averaging circuit 3306, so that the anomaly detection time period can be greatly reduced, the startup time can be reduced, and anomaly detection can be performed page by page.

Next, a description will be given of a second embodiment according to the present invention. The basic construction of the image reading apparatus according to the second embodiment is the same as that of the first embodiment described above, which is shown in FIG. 9. Component elements corresponding to those in the image reading apparatus according to the first embodiment are designated by identical reference numerals, and description thereof is omitted.

Figure 4:
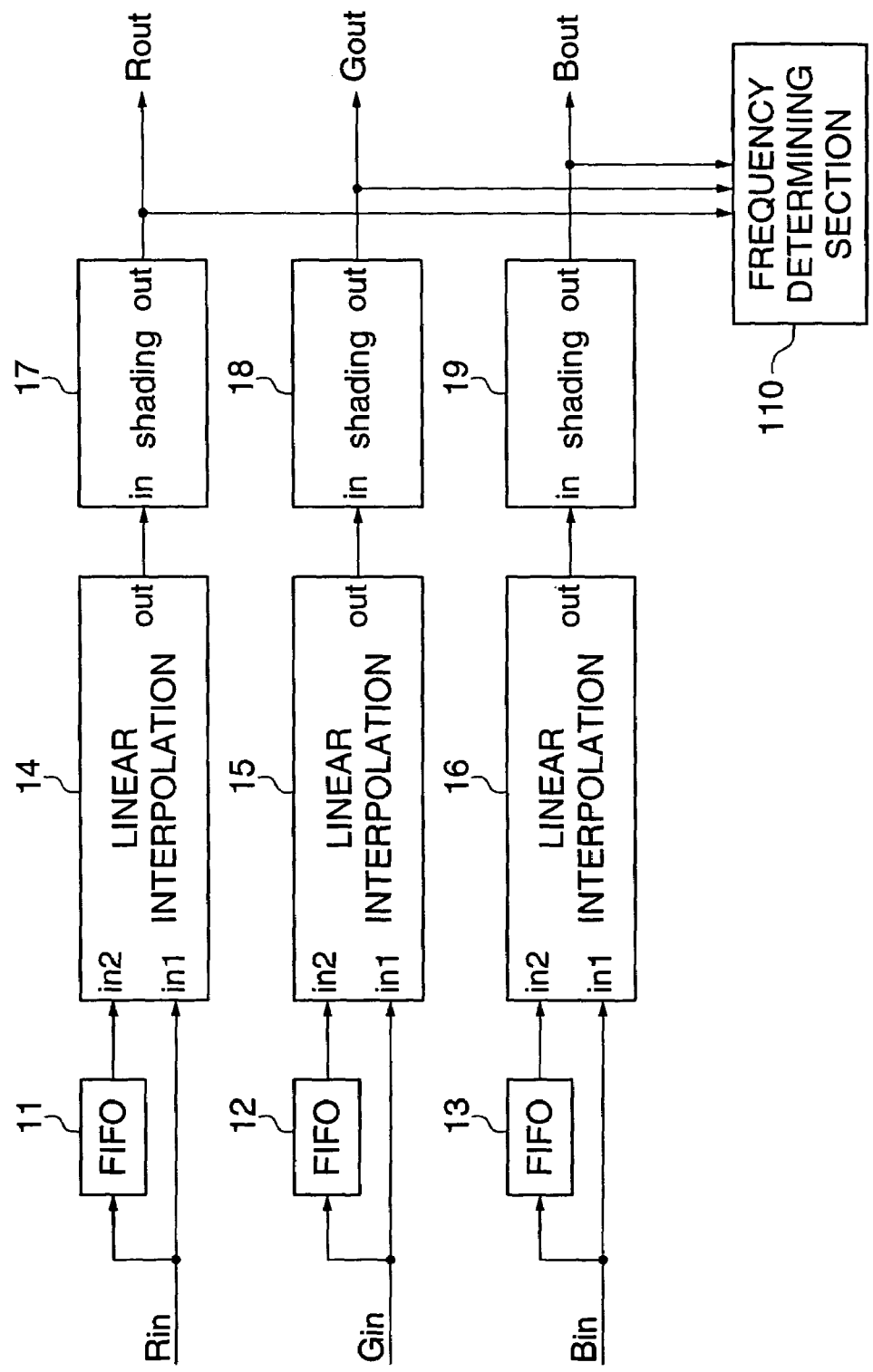
FIG. 4 is a block diagram showing the arrangement of functions of an image reading apparatus according to a second embodiment of the present invention.

FIG. 4 is a block diagram showing the arrangement of functions of the image reading apparatus according to the second embodiment. In FIG. 4, reference numerals 11, 12, and 13 denote FIFO memories that each perform a one-line delay process on corresponding one of the input image data Rin, Gin, Bin, which are the read color image data. Input image data Rin, Gin, Bin are input to the respective FIFO memories 11, 12, and 13, where the input image data are delayed by one line. The delayed image data Rin, Gin, Bin are read out as delayed Rin, Gin, Bin signals from the FIFO memories 11, 12, and 13 in synchronism with inputting of subsequent image data Rin, Gin, Bin to the FIFO memories 11, 12, and 13, and are inputted to linear interpolation sections 14, 15, and 16, respectively. The linear interpolation sections 14, 15, and 16 each have a terminal in2, a terminal in2 and an output terminal.

The linear interpolation section 14 performs a calculation according to Equation 3 given below on a Rin signal inputted via the terminal in1 and the delayed Rin signal inputted via the terminal in2 and outputs the calculation result via the output terminal:

$$out=(in1 \times KF)+(in2 \times (1-KF)) \quad (3)$$

Here, symbol KF denotes an interpolation coefficient, and by setting the interpolation coefficient KS to "1", the Rin signal inputted via the terminal in1 is directly outputted via the output terminal. The linear interpolation sections 15, 16 also perform the same processing.

Figure 14:
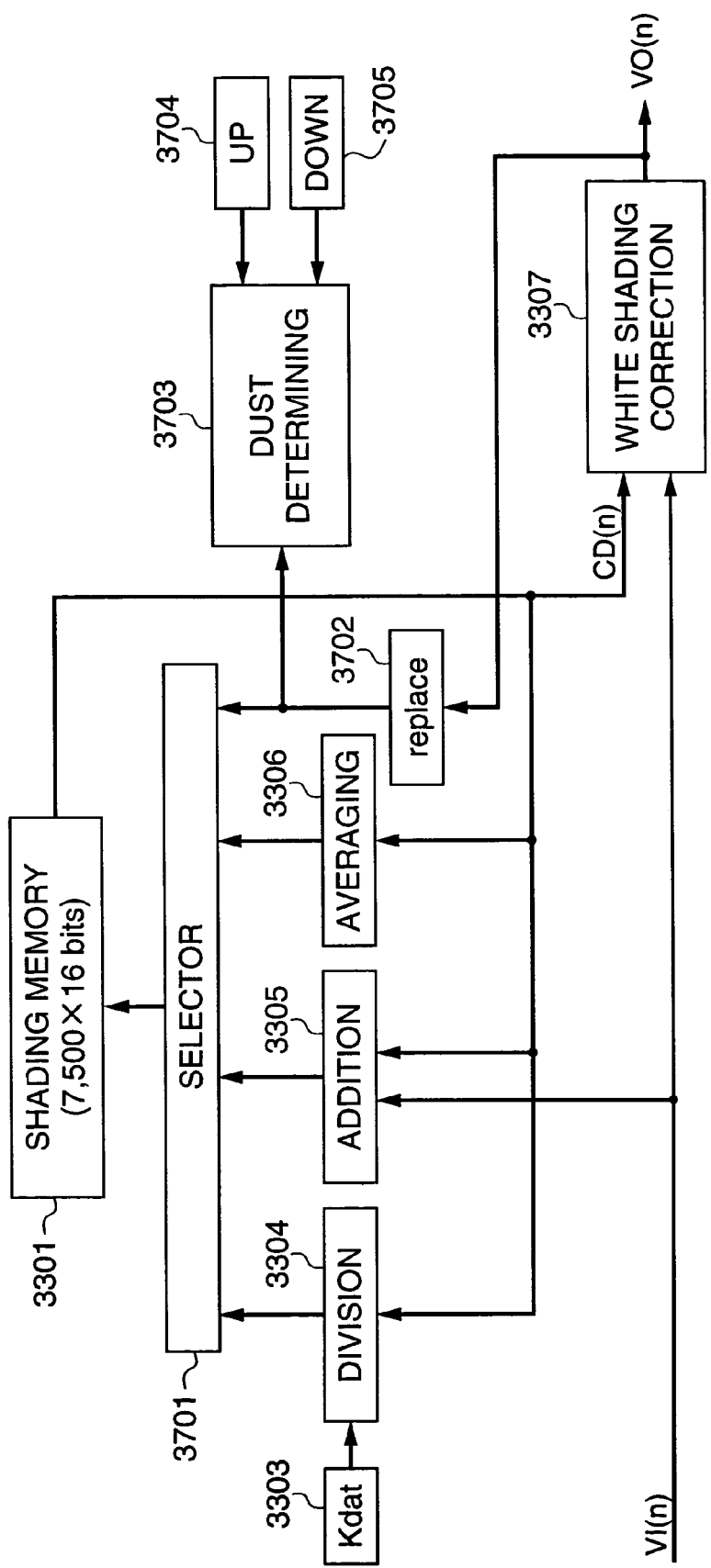
FIG. 14 is a block diagram showing the internal construction of a white shading correction circuit of a second conventional image reading apparatus.
Figure 15:
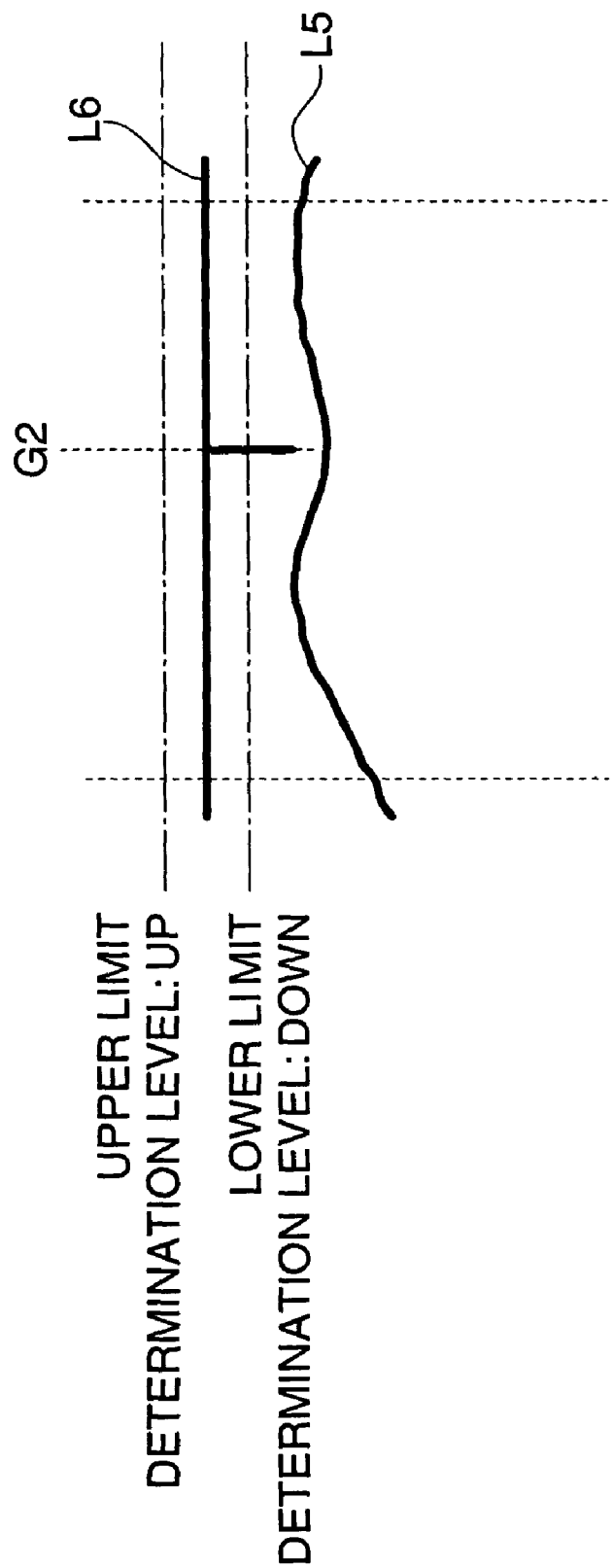
FIG. 15 is a diagram showing waveforms indicative of a result of a dust detecting operation that uses the white shading correction circuit of the image reading apparatus appearing in FIG. 14.

Reference numerals 17, 18, 19 denote shading sections that are constructed in the same way and achieve the same functions as the white shading correction circuit in the second conventional image reading apparatus shown in FIG. 14, detailed description thereof is therefore omitted. The outputs from the linear interpolation sections 14, 15, 16 are inputted, respectively, to the shading sections 17, 18, 19, which in turn output signals Rout, Gout, Bout subjected to shading correction. Reference numeral 110 denotes a frequency determining section that determines the occurrence frequency of anomalies. The outputs from the shading sections 17, 18, 19 are also inputted to the frequency determining section 110.

Figure 5:
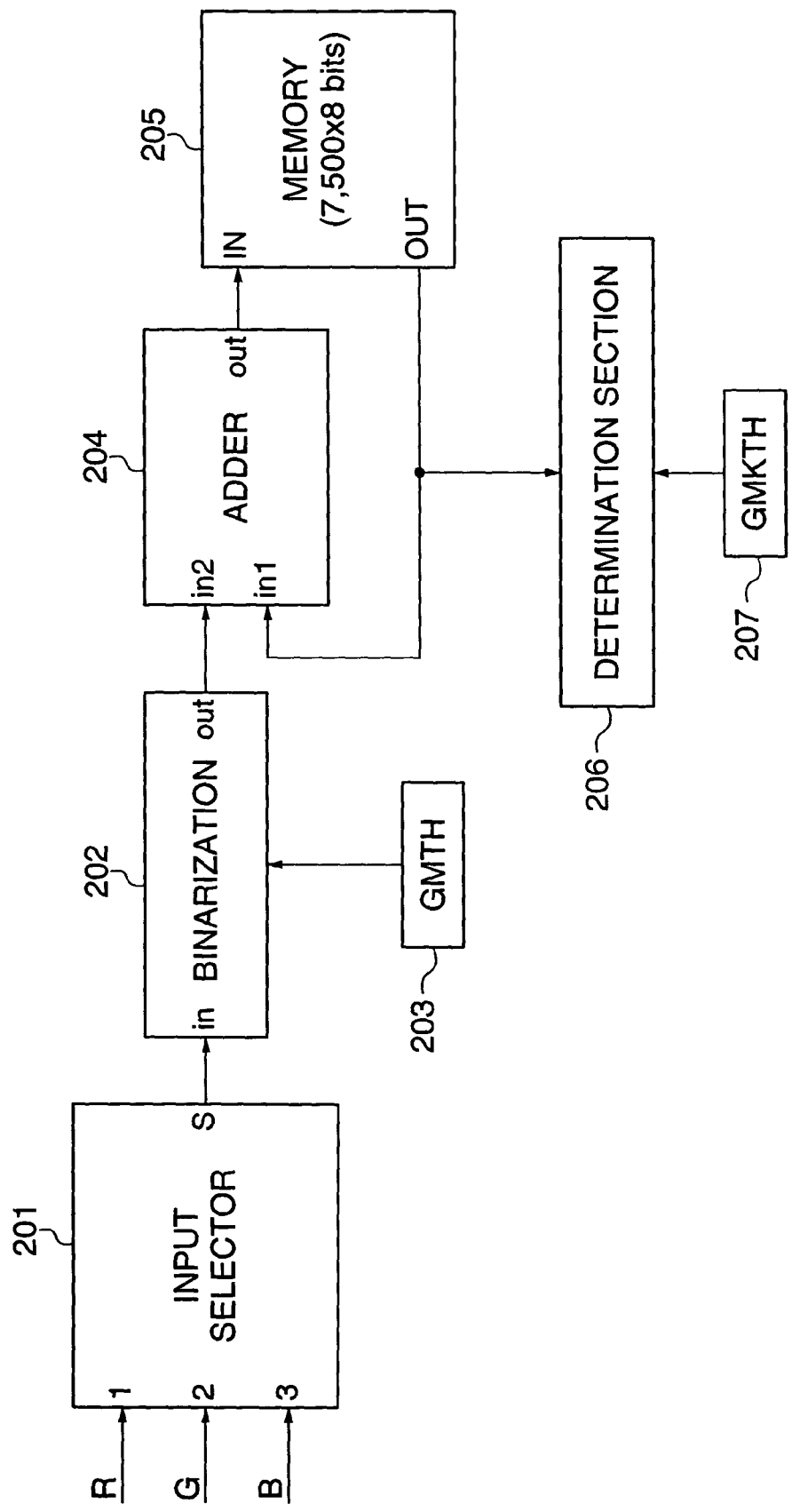
FIG. 5 is a block diagram showing the detailed construction of a frequency determining section appearing in FIG. 4.

FIG. 5 is a block diagram showing the detailed construction of the frequency determining section 110 appearing in FIG. 4. In FIG. 5, reference numeral 201 denotes an input selector that selects one out of the inputted R, G, B signals (signals Rout, Gout, Bout subjected to shading correction from the shading sections 17, 18, 19) as an input signal. Reference numeral 203 denotes a register that stores a binarization level GMTH. Reference numeral 202 denotes a binarization circuit that performs a binarization process on the selected input signal using the binarization level GMTH stored in the register 203 as a reference level and outputs "1" when the level of the input signal is lower than the binarization level GMTH.

Reference numeral 204 denotes an adder that adds an output from the binarization circuit 202 and an output from a memory 205, described later, and outputs the addition result to the memory 205. The adder 204 adds the 8-bit data from the memory 205 and the 1-bit data from the binarization circuit 202 such that the binary data inputted via the terminal in2 from the binarization circuit 202 is assigned to the LSB of the addition result data to be outputted and the remaining bits of the addition result data are fixed at "0". Reference numeral 205 denotes a memory with a 7,500×8-bit capacity that stores an output from the adder 204. The data stored in the memory 205 is read out and outputted to the adder 204 as well as to a determination section 206. Reference numeral 207 denotes a register that stores a frequency determination level GMKTH. The determination section operates so as to output "1" as a determination result when the data read out from the memory 205 is larger than the frequency determination level GMKTH stored in the register 207.

The frequency determining section 110 determines the occurrence frequency of anomalies in 255 lines only one time, and the determination results of the binarization circuit 202 for 255 lines are stored pixel by pixel in the memory 205. Since anomalies that are caused by dust and scratches, etc. occur in stable patterns, by appropriately setting the frequency determination level GMKTH, it is possible to reduce the number of erroneous dust determinations due to random noise components in the image data.

Next, the dust detecting operation of the present embodiment will be described. When detecting dust, the interpolation coefficient KF for use in the linear interpolation sections 14, 15, 16 is set to "0.5".

Figure 6A:
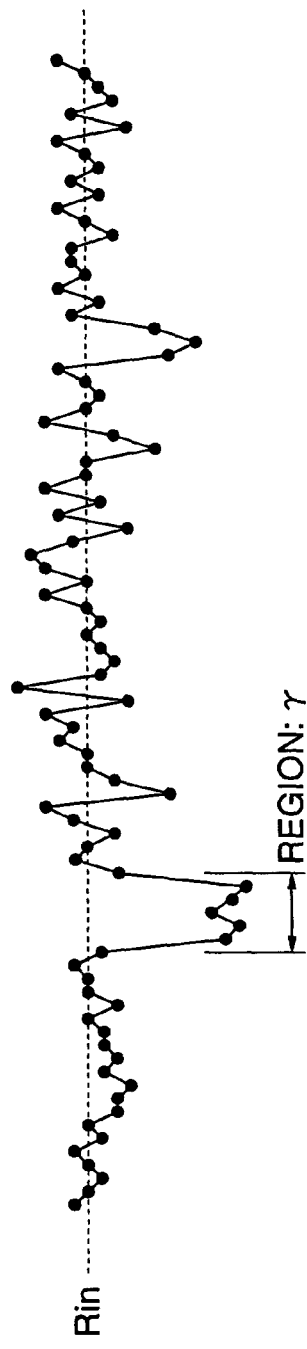
FIGS. 6A to 6C are diagrams showing input and output waveforms of a linear interpolation section when an interpolation coefficient KF is set to "0.5"
Figure 6B:
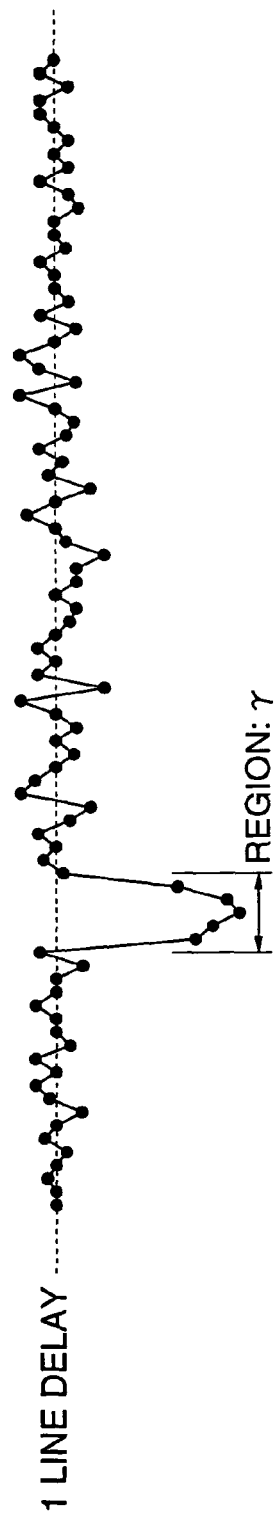
Figure 6C:
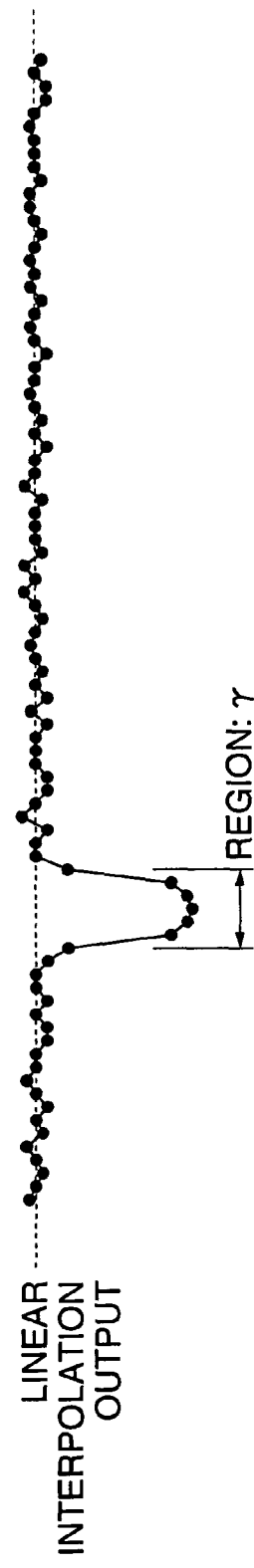

FIGS. 6A to 6C show input and output waveforms of the linear interpolation section 14 when the interpolation coefficient KF is set to "0.5". FIG. 6A shows the waveform of the Rin signal inputted to the linear interpolation section 14 via the terminal in1. FIG. 6B shows the waveform of the delayed Rin signal that is delayed by one line by the FIFO memory 11 and is inputted to the linear interpolation section 14 via the terminal in2, that is, a signal waveform preceding the signal waveform of FIG. 6A by one line. FIG. 6C shows the result of a calculation process according to Equation 3 above and is the output waveform of the linear interpolation section 14. In these figures, the region γ is the part where dust is present.

From FIG. 6C, it can be understood that random noise components are suppressed by performing the linear interpolation process. The same process is performed by the linear interpolation sections 15, 16. It should also be noted that the above interpolation process is performed only when dust detection is executed.

A signal with random noise components suppressed by the linear interpolation section 14 is inputted to the shading section 17. Shading and dust detection are performed by the shading section 17 as described with reference to FIG. 14.

FIG. 7 shows the relationship between image data stored in the shading memory 3301 after a replace operation performed by the shading section 17 and the dust determination levels. From FIG. 7, it can be understood that anomalies have been correctly detected in the region γ (i.e. dust has been correctly detected) without erroneous determinations with respect to the upper limit determination level "UP" and the lower limit determination level "DOWN" due to random noise components.

In the present embodiment, the anomaly detection process can be performed by the frequency determining section 110 as well. The same value as the lower limit determination level "DOWN" is set in the register 203 as the binarization level GMTH, and anomaly occurrence frequencies for 255 lines are stored in the memory 205.

Figure 8:
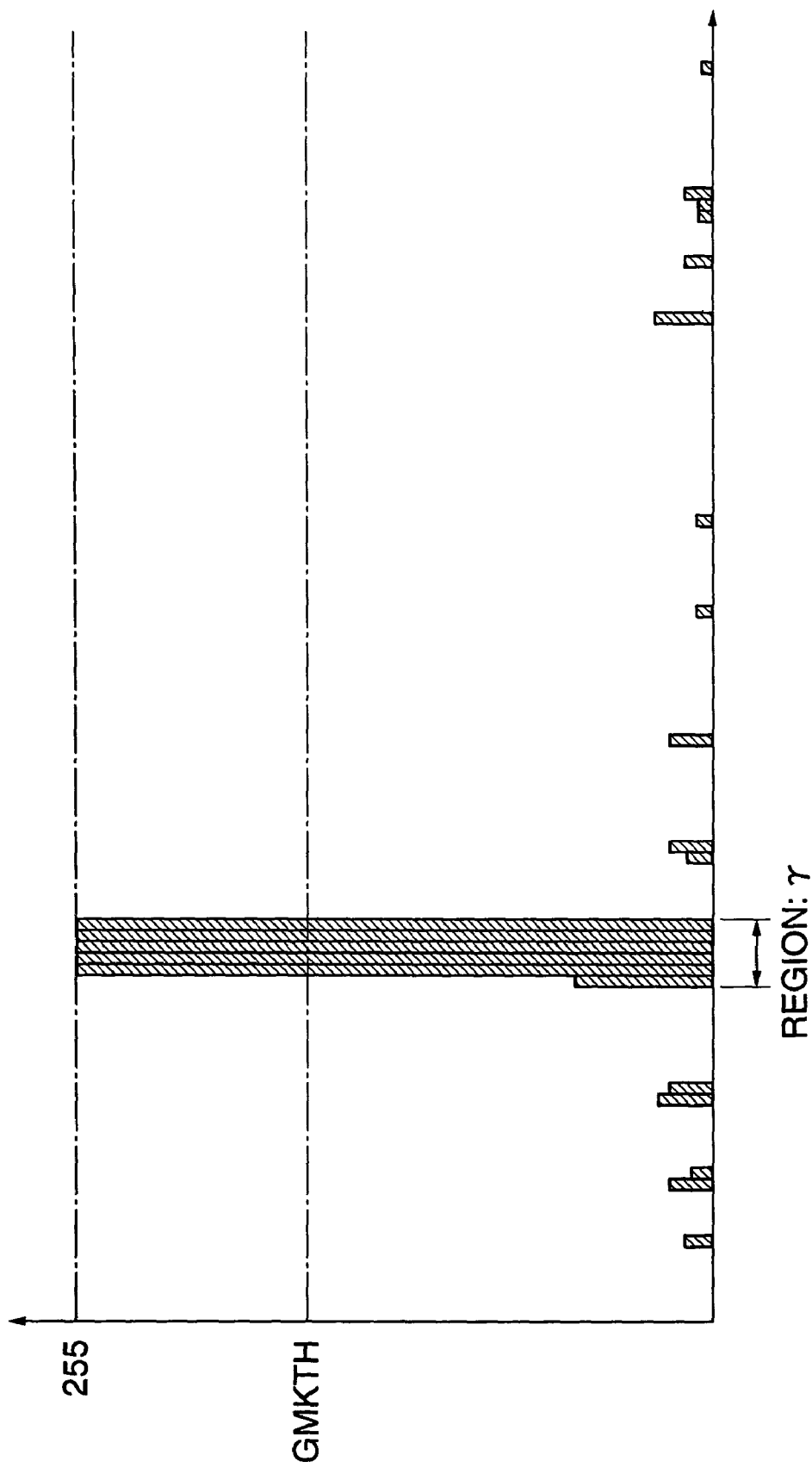
FIG. 8 is a diagram showing data stored in a memory, that is expressed in the form of a frequency graph.

FIG. 8 shows data stored in the memory 205, that is expressed in the form of a frequency graph. In FIG. 8, it can be seen that anomalies are detected at the region γ for all 255 lines. In some pixels in other regions, anomalies are detected, though with low frequencies, which anomalies are attributed to random noise components in the image data.

"128", for example, is set in the register 207 of the frequency determining section 110 as the frequency determination level GMKTH. The determination section 206 of the frequency determining section 110 determines whether there are parts in the data stored in the memory 205 where the occurrence frequency is above 128 times, and outputs the determination result "1" if the occurrence frequency is above 128 times. In this way as well, dust can be detected.

If the time period required for dust detection for one line is assumed to be around 300 μs, the time periods required for dust detection by the shading section 17 and the frequency determining section 110, respectively, are 300 μs and 76.5 ms, since a replace operation is carried out for one line by the shading section 17, and the frequency determination is carried out for 255 lines in the frequency determining section 110.

Thus, in the present embodiment, the two separate dust detection means are provided. A selection as to whether one of these means is to be used or whether both are to be used in combination can be made as appropriate depending upon the system.

As described above, according to the present embodiment, random noise components in the image data before shading correction are suppressed by the linear interpolation process, and an anomaly detection process is then performed to detect dust, scratches, and dirt on the standard white plate 3002 from the image data with random noise components suppressed and on which shading correction has been carried out. As a result, the same effects as those obtained by the first embodiment can be obtained, that is, it is possible to improve the detection accuracy of dust, scratches, and dirt while ensuring that shading correction is performed at high speed.

Further, means for suppressing random noise components is constructed of the FIFO memories that delay the read image data by one line and the line interpolation sections that perform interpolation processing on read image data and delayed image data obtained by delaying the read image data, to provide the same effect as that obtained by the first embodiment, that is, the anomaly detection time period can be reduced.

Furthermore, by carrying out the interpolation process only when detecting anomalies, the accuracy detection of anomalies can be improved without affecting the normal image reading operation.

It should be noted that in so far as it is possible to suppress random noise components in the image data, other random noise suppressing means may be employed in the first and second embodiments.

Furthermore, the object of the present invention may also be accomplished by supplying a system or an apparatus with a storage medium on which a program code of software which realizes the functions of either of the above described embodiments is recorded, and causing a computer (or CPU or MPU) of the system or apparatus to read out and execute the program code stored on the storage medium. In this case, the program code itself that is read out from the storage medium realizes the functions of either of the embodiments described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image reading apparatus comprising:
   a white reference member;
   an original document support member;
   an image reading device selectively capable of imaging an original document placed on the original document support member and a reference surface of the white reference member, wherein the image read device generates white reference image data when the image reading device images the reference surface of the white reference member and generates original image data when the image reading device images an original document placed on the original document support member;
   a random noise suppressing device that suppresses random noise components in the white reference image data generated by the image reading device;
   a detecting device that detects a location of one or more abnormalities in the white reference image data in which random noise components have been suppressed by the random noise suppressing device, wherein each abnormality corresponds with the presence of foreign matter on the reference surface of the white reference member; and
   an abnormality identification device that generates an abnormality signal indicative of the detected location of the abnormality.

2. An image reading apparatus according to claim 1, wherein said random noise suppressing device suppresses random noise components by averaging the white reference image data read by the image reading device.

3. An image reading apparatus according to claim 1, wherein said random noise suppressing device suppresses random noise components by carrying out an interpolation process on the white reference image data read by the image reading device.

4. An image reading apparatus according to claim 3, wherein said random noise suppressing device comprises a delay device and an interpolation device.

5. An image reading apparatus according to claim 1, further comprising a shading correction device that carries out a shading correction based on the white reference image data read out by the imaging device, and wherein said random noise suppressing device suppresses random noise components in the white reference image data on which the shading correction has been carried out by said shading correction device.

6. An image reading apparatus according to claim 1, further comprising a shading correction device that carries out a shading correction based on the white reference image data having random noise components suppressed by said random noise suppressing device, and wherein said detection device detects abnormality on the white reference member based on the white reference image data on which the shading correction has been carried out by said shading correction device.

7. An image reading apparatus according to claim 1, wherein said random noise suppressing device operates only when an abnormality is to be detected on the white reference member by said detection device.

8. An image reading apparatus according to claim 1, wherein the image reading device images the reference surface prior to imaging an original document placed on the original document support member so that the detecting device can detect the location of the abnormalities prior to the imaging of the original document.

9. An image reading apparatus comprising:
   a white reference member;
   an original document glass;
   an image reading device selectively capable of imaging an original document placed on the original document glass and a reference surface of the white reference member, wherein the image read device generates white reference image data when the image reading device images the reference surface of the white reference member and generates original image data when the image reading device images an original document on the original document glass;
   a random noise suppressing device that suppresses random noise components in the white reference image data;
   a detecting device that detects a location of one or more abnormalities in the white reference image data in which random noise components have been suppressed by the random noise suppressing device, wherein each abnormality corresponds with the presence of foreign matter on the reference surface of the white reference member; and
   an abnormality identification device that generates an abnormality signal indicative of the detected location of the abnormality.

* * * * *